Nov. 5, 1929.    C. MARCH    1,734,818
INSECT TRAP
Filed Oct. 1, 1928
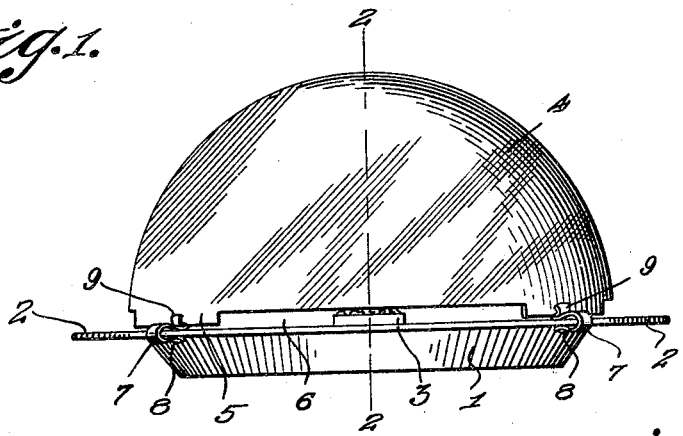
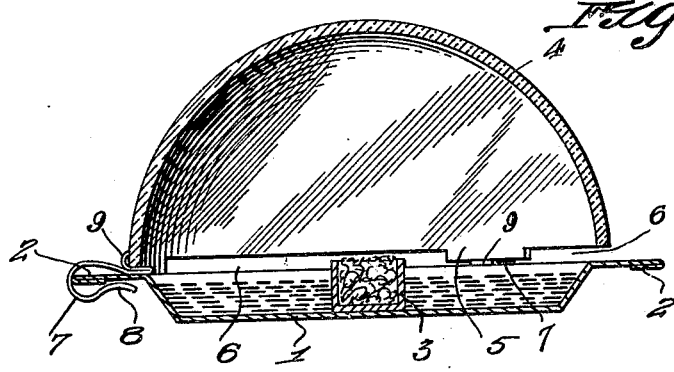
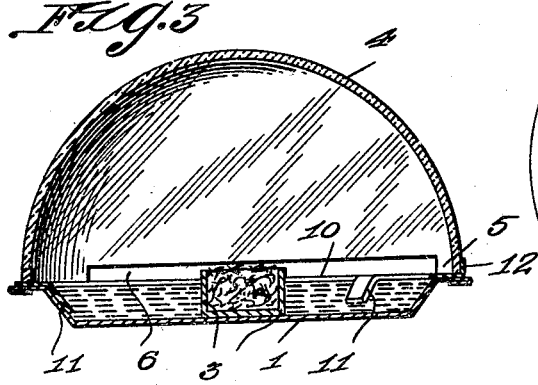
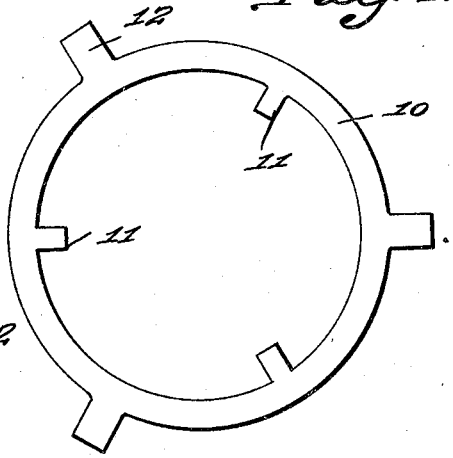
Carl March, INVENTOR
BY Victor J. Evans ATTORNEY Patented Nov. 5, 1929

1,734,818

UNITED STATES PATENT OFFICE

CARL MARCH, OF CHICAGO, ILLINOIS

INSECT TRAP

Application filed October 1, 1928. Serial No. 309,488.

This invention relates to insect traps, and its general object is to provide a trap that will entice and trap flies and the like in an effective manner.

A further object of the invention is to provide a trap of the character set forth that is simple in construction, ornamental in appearance, and efficient in performing its intended function.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a view of one form of my invention.

Figure 2 is a sectional view taken approximately on line 2—2 of Figure 1.

Figure 3 is a similar view taken through a modified form of my invention.

Figure 4 is a detail view of a clamping ring which forms a part of the invention as shown in Figure 3.

Referring to the drawings in detail, the invention in the form as disclosed includes a pan 1 which may be constructed from any water proof material including glass and metal, and the pan as shown is provided with a relatively wide flange 2 extending horizontally from the upper edge of the side wall of the pan as best shown in Figure 2. The body of the pan is relatively shallow and adapted to receive liquid and the like which is poisonous to insects. A bait holder such as indicated by the reference numeral 3 is adapted to be arranged centrally of the pan for the purpose of receiving the bait for enticing insects within the trap.

The form of trap as shown is round in plan, and in this form I provide a dome shaped cover 4 which may be formed from glass or other transparent material, and said cover is provided with projections 5 depending from the lower edge thereof for the purpose of supporting the cover on the flange 2 with portions in spaced relation to the flange to provide an entrance for the insects to the trap and these entrances are indicated by the reference numeral 6.

In Figures 1 and 2, I have illustrated one form of clamping means to prevent displacement of the cover 4, and in this form I provide a plurality of clamps each of which includes a substantially U-shaped body 7 with one of the arms thereof terminating in a spring finger 8, while the opposite arm is bent reversibly upon itself and terminating in an upwardly curved tongue 9 which is adapted to engage the cover as best shown in Figure 2, while the spring finger 8 engages the bottom of the flange 2 whereby lateral movement of the cover will be prevented but it can be raised from the pan with very little difficulty, as will be apparent.

The clamping means as shown in Figures 3 and 4 includes a ring 10 formed from flat bendable substantially flexible material and is adapted to repose upon the flange 2 to receive the projections of the cover thereon as shown in Figure 3. Extending inwardly from the ring and formed integrally therewith are relatively small tongues 11 which are adapted to be bent downwardly to conform to the sloping side wall of the pan and thereby prevent movement of the ring on the pan. Extending outwardly from the ring approximately between the tongues 11 are projections 12 which are adapted to be bent upwardly at right angles to the ring for engagement with the outer side of the cover.

From the above description and disclosure of the drawings, it will be obvious that I have provided a fly trap which will be extremely effective in enticing and trapping flies and yet is clean and sanitary as well as being attractive in appearance.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A trap of the character described comprising a pan, a flange formed therewith, a cover for said pan, projections depending from said cover for spacing portions of said cover from said flange to provide entrance openings, resilient clamping means detachably secured to said flange and means included in the resilient means for engagement with said cover to prevent displacement thereof.

2. A trap of the character described comprising a pan, a cover therefor, projections included in said cover to provide entrance openings, a bait holder arranged in said pan, a ring reposing upon said pan, means formed with said ring and engageable with said pan to prevent movement of said ring thereon, and projections rising from said ring for engagement with said cover to prevent displacement thereof.

In testimony whereof I affix my signature.

CARL MARCH.